United States Patent
Li

(10) Patent No.: US 12,049,006 B2
(45) Date of Patent: Jul. 30, 2024

(54) DRAGGING DEMONSTRATION SYSTEM AND METHOD

(71) Applicant: SHANGHAI JAKA ROBOTICS LTD., Shanghai (CN)

(72) Inventor: Mingyang Li, Shanghai (CN)

(73) Assignee: JAKA ROBOTICS CO., LTD., Shanghai (CN)

( * ) Notice: Subject to any disclaimer, the term of this patent is extended or adjusted under 35 U.S.C. 154(b) by 873 days.

(21) Appl. No.: 17/257,851

(22) PCT Filed: Jul. 2, 2019

(86) PCT No.: PCT/CN2019/094431
§ 371 (c)(1),
(2) Date: Jan. 4, 2021

(87) PCT Pub. No.: WO2020/007305
PCT Pub. Date: Jan. 9, 2020

(65) Prior Publication Data
US 2021/0291364 A1      Sep. 23, 2021

(30) Foreign Application Priority Data
Jul. 3, 2018   (CN) .......................... 201810711257.6

(51) Int. Cl.
*B25J 9/16*        (2006.01)
*G05B 17/02*       (2006.01)
*G05B 19/423*      (2006.01)

(52) U.S. Cl.
CPC .......... *B25J 9/1605* (2013.01); *B25J 9/1653* (2013.01); *G05B 17/02* (2013.01); *G05B 19/423* (2013.01);
(Continued)

(58) Field of Classification Search
CPC ....... B25J 9/1605; B25J 9/1653; G05B 17/02; G05B 19/423; G05B 2219/39181; G05B 2219/41448; G05B 2219/50391
See application file for complete search history.

(56) References Cited

FOREIGN PATENT DOCUMENTS

| CN | 103425100 A | 12/2013 |
|---|---|---|
| CN | 105479459 A | 4/2016 |

(Continued)

OTHER PUBLICATIONS

Längkvist M. Online Identification of Friction Coefficients in an Industrial Robot. (Year: 2009).*
(Continued)

*Primary Examiner* — Chuen-Meei Gan
(74) *Attorney, Agent, or Firm* — ArentFox Schiff LLP

(57) ABSTRACT

A dragging demonstration system and method. The dragging demonstration system comprises: a model identification module configured to build a static model of a robot and identify model parameters, wherein the static model comprises a gravity model and a Coulomb friction model; a feedforward compensation module configured to convey the identified model parameters to a current ring of each joint motor of the robot in a feedforward way according to the identified model parameters; and a data recording module configured to record the position information of each joint of the robot so that the robot can repeat the demonstration action. The system and method can make a user push the robot quite easily to implement dragging demonstration.

6 Claims, 5 Drawing Sheets

(52) U.S. Cl.
CPC .............. *G05B 2219/39181* (2013.01); *G05B 2219/41448* (2013.01); *G05B 2219/50391* (2013.01)

(56) References Cited

FOREIGN PATENT DOCUMENTS

| | | |
|---|---|---|
| CN | 106313044 A | 1/2017 |
| CN | 107097233 A | 8/2017 |
| CN | 107717983 A | 2/2018 |
| CN | 108839023 A | 11/2018 |
| EP | 2875914 A | 5/2015 |
| JP | 2009006465 A | 1/2009 |

OTHER PUBLICATIONS

Indri M, Lazzero I, Antoniazza A, Bottero AM. Friction modeling and identification for industrial manipulators. In2013 IEEE 18th conference on emerging technologies & factory automation (ETFA) Sep. 10, 2013 (pp. 1-8). IEEE. (Year: 2013).*

Masayoshi Iwatani Identification, Compensation and Estimation of Joint Friction of Robotic Manipulators (Doctoral dissertation, ). (Year: 2016).*

International Search Report and Written Opinion for International application No. PCT/CN2019/094431, Sep. 19, 2019, ISA/CN.

European Search Report for corresponding European application No. 19830246.5, Jul. 7, 2021, European Patent Office.

Stolt Andreas et al. Sensorless friction-compensated passive lead-through programming for industrial robots, Sep. 28, 2015 (Sep. 28, 2015), 2015 IEEE/RSJ International Conference on Intelligent Robots and Systems (IROS), IEEE, pp. 3530-3537, XP032832091, DOI: 10.1109/IROS.2015.7353870 [retrieved on Dec. 11, 2015].

Bruno Siciliano et al: Robotics—Dynamics—Chapter 7 in "Robotics: Modelling, planning and control", Dec. 23, 2009, Springer.

Michael James et al: Nonlinear Control of an Industrial Robot, Oct. 1, 1989 (Oct. 1, 1989), pp. 1-327, XP055818912, Retrieved from the Internet: URL:https://hydra.hull.ac.uk/assets/hull: 1 1077a/ content [retrieved on Jun. 28, 2021].

Wu Jun et al: "An overview of dynamic parameter identification of robots", Robotics and Computer Integrated Manufacturing., vol. 26, No. 5, Oct. 1, 2010 (Oct. 1, 2010), pp. 414-419, XP055818913, GBISSN: 0736-5845, DOI:10.1016/j.rcim.2010.03.013.

Stolt Andreas et al: "Robotic force estimation using dithering to decrease the low velocity friction uncertainties", 2015 IEEE International Conference on Robotics and Automation (ICRA), IEEE, May 26, 2015 (May 26, 2015), pp. 3896-3902, XP033168956, DOI: 10.1109/ICRA.2015.7139742 [retrieved on Jun. 29, 2015].

Notification to Grant for Chinese patent application No. 201810711257. 6, dated Nov. 5, 2021, Chinese Patent Office.

Office action dated Jul. 20, 2021 for corresponding European patent application No. 19830246.5, European Patent Office .

Office action dated Nov. 14, 2023 for corresponding European patent application No. 19830246.5, European Patent Office.

Office action dated Nov. 30, 2020 for Chinese patent application No. 201810711257.6, Chinese Patent Office.

Office action dated Jun. 18, 2021 for Chinese patent application No. 201810711257.6, Chinese Patent Office.

\* cited by examiner

DRAGGING DEMONSTRATION SYSTEM AND METHOD

CROSS-REFERENCE TO RELATED APPLICATIONS

This application is a 371 U.S. national stage of PCT/CN2019/094431, filed Jul. 2, 2019, which claims priority of Chinese Patent Application No. 201810171125 7.6, filed Jul. 3, 2018, the contents of each of which are incorporated herein by reference in their entirety.

TECHNICAL FIELD

The present disclosure relates to the technical field of control of industrial robots, and in particular to a drag teaching system (dragging demonstration system) and method.

BACKGROUND ART

Drag teaching (teaching by dragging), also known as direct teaching or manual guidance, is one of the main modes of human-robot cooperation, that is to say, a person carries out a teaching operation on a robot by directly manually dragging the robot. The traditional teaching mode relies mainly on a teaching pendant, but such teaching mode has the drawbacks of low operation efficiency, cumbersome and non-straightforward process, and high requirements on the knowledge level of an operator. The drag teaching mode is relatively straightforward, with greatly reduced requirements on the operator on site.

SUMMARY

Objects of the present disclosure include, for example, providing a drag teaching system and method which enable a user to easily push up a robot to carry out pulling (or dragging) teaching.

An embodiment of the present disclosure implements a drag teaching system, characterized by being applicable to a robot, the drag teaching system comprising:
a model identification module configured to establish a static model of the robot and identify model parameters, wherein the static model includes a gravity model and a Coulomb friction model;
a feedforward compensation module configured to transmit the identified model parameters to a current loop of a motor of each joint of the robot in a feedforward manner; and
a data recording module configured to record position information on each joint of the robot for enabling the robot to reproduce a taught motion.

Optionally, in the embodiment of the present disclosure, the static model of the robot is expressed as:

$$\tau_i = -z_0^T \cdot \left[ \sum_{j=i}^{n} m_j (p_{i-1,j} + R_j^{i-1} \cdot r_j) \right] \times (R_0^{i-1} \cdot g) + f_i \cdot \text{sgn}(\dot{q}_i) \quad (1)$$

in the equation (1), i represents the $i^{th}$ link, $z_0$ is a constant vector $[0\ 0\ 1]^T$, $m_j$ is the mass of the $j^{th}$ link, $p_{i-1,j}$ is a vector oriented from an origin of a coordinate system for the $i-1^{th}$ link to an origin of a coordinate system for the $j^{th}$ link, $R_j^{i-1}$ is a rotation matrix from the coordinate system for the $j^{th}$ link to the coordinate system for the $i-1^{th}$ link, $r_j$ is a center-of-mass coordinate of the link in the coordinate system for the $j^{th}$ link, g is a gravity acceleration vector in the world coordinate system, $f_i$ is a Coulomb friction of a proximal joint of the link, $\text{sgn}(\dot{q}_i)$ is a sign operator, $\dot{q}_i$ is a velocity of the $i^{th}$ joint, and n is the number of the joints of the robot;
assuming $\tau = [\tau_1 \ldots \tau_i \ldots \tau_n]^T$, $\pi = [\pi_g^T \pi_f^T]^T$, where $\pi_g = g \cdot [m_1 r_1^T m_1 \ldots m_i r_i^T m_i \ldots m_n r_n^T m_n]^T$, g is the acceleration constant, and $\pi_f = [f_1 \ldots f_i \ldots f_n]^T$, the equation (1) may be expressed as:

$$\tau = Y \cdot \pi \quad (2)$$

in the equation above, $Y = [Y_g\ Y_f]$, which is a regression matrix, $$Y_g = \begin{bmatrix} z_0^T \cdot S(z_g) \cdot [R_1^0 p_{01} & \ldots & R_i^0 p_{0,i} & \ldots & R_n^0 p_{0,n}] \\ \vdots \\ z_0^T \cdot S(R_0^{i-1} \cdot z_g) \cdot [0\ 0 & \ldots & R_i^{i-1} p_{i-1,i} & \ldots & R_n^{i-1} p_{i-1,n}] \\ \vdots \\ z_0^T \cdot S(R_0^{n-1} \cdot z_g) \cdot [0\ 0 & \ldots & 0\ 0 & \ldots & R_n^{n-1} p_{n-1,n}] \end{bmatrix};$$

$$Y_f = \begin{bmatrix} \text{sgn}(\dot{q}_1) & \ldots & 0 & \ldots & 0 \\ & \vdots & & & \\ 0 & \ldots & \text{sgn}(\dot{q}_i) & \ldots & 0 \\ & & \vdots & & \\ 0 & \ldots & 0 & \ldots & \text{sgn}(\dot{q}_n) \end{bmatrix}$$

in the equation above, $S(\cdot)$ is a cross product operator, $Y_g$ is a matrix of (n×4n), $Y_f$ is a diagonal matrix of (n×n), and $z_g$ is a unit vector with the same orientation as g; the static model of the robot is identified based on the equation (2) and using the least squares method, namely $$\pi^* = (Y^T \cdot Y)^{-1} \cdot Y^T \cdot T \quad (3)$$

in the equation above, $$Y = \begin{bmatrix} Y_1^* \\ M \\ Y_N^* \end{bmatrix}, \pi^* = (Y^T \cdot Y)^{-1} \cdot Y^T \cdot T.$$

Optionally, in the embodiment of the present disclosure, the position information on each joint of the robot includes:
a position of a key point of the robot or a trace of dragging of the robot during the drag teaching.

Optionally, in the embodiment of the present disclosure, a velocity fed back from each joint of the robot is filtered by a filter with a preset cutoff frequency to reduce a noise signal in the velocity signal; a square wave signal with a certain threshold value and a certain frequency is superposed to the feedforward signal so as to overcome a static friction force at the start of a drag teaching function, wherein the threshold value is set to be related to the magnitude of the static friction force, and the frequency is set to be related to a startup effect; and after the robot starts moving, the square wave signal is rapidly attenuated to zero so as to improve the comfortableness of the drag teaching. Optionally, in the embodiment of the present disclosure, experimental data of a complete cycle are introduced into Y* according to the formula $\tau = Y^* g \pi^*$ to calculate a set of torque values predicted by the static model, and the torque values are compared with the recorded current commands to verify whether the identified parameters of the static model are correct or not.

An embodiment of the present disclosure further discloses a drag teaching method, characterized by comprising steps of:

S1: establishing a static model of a robot and identifying model parameters, wherein the static model includes a gravity model and a Coulomb friction model;

S2: transmitting the identified model parameters to a current loop of a motor of each joint of the robot in a feedforward manner; and S3: recording position information on each joint of the robot for enabling the robot to reproduce a taught motion.

Optionally, in the embodiment of the present disclosure, the static model of the robot is expressed as:

$$\tau_i = -z_0^T \cdot \left[\sum_{j=i}^{n} m_j \left(p_{i-1,j} + R_j^{i-1} \cdot r_j\right)\right] \times \left(R_0^{i-1} \cdot g\right) + f_i \cdot \mathrm{sgn}(\dot{q}_i) \quad (1)$$

in the equation (1), i represents the $i^{th}$ link, $z_0$ is a constant vector $[0\ 0\ 1]^T$, m is the mass of the $j^{th}$ link, $p_{i-1,j}$ is a vector oriented from an origin of a coordinate system for the $i-1^{th}$ link to an origin of a coordinate system for the $j^{th}$ link, $R_j^{i-1}$ is a rotation matrix from the coordinate system for the $j^{th}$ link to the coordinate system for the $i-1^{th}$ link, $r_j$ is a center-of-mass coordinate of the link in the coordinate system for the $j^{th}$ link, g is a gravity acceleration vector in the world coordinate system, $f_i$ is a Coulomb friction of a proximal joint of the link, $\mathrm{sgn}(\dot{q}_i)$ is a sign operator, $\dot{q}_i$ is a velocity of the $i^{th}$ joint, and n is the number of the joints of the robot;

assuming $\tau = [\tau_1 \ldots \tau_i \ldots \tau_n]^T$, $\pi = [\pi_g^T \pi_f^T]^T$, where $\pi_g = g \cdot [m_1 r_1^T m_1 \ldots m_i r_i^T m_i \ldots m_n r_n^T m_n]^T$, g is the acceleration constant, and $\pi_f = [f_1 \ldots f_i \ldots f_n]^T$, the equation (1) may be expressed as:

$$\tau = Y \cdot \pi \quad (2)$$

in the equation above, $Y = [Y_g\ Y_f]$, which is a regression matrix, $$Y_g = \begin{bmatrix} z_0^T \cdot S(z_g) \cdot [R_1^0 p_{01} & \ldots & R_i^0 p_{0,i} & \ldots & R_n^0 p_{0,n}] \\ & \vdots & & & \\ z_0^T \cdot S(R_0^{i-1} \cdot z_g) \cdot [0\ 0 & \ldots & R_i^{i-1} p_{i-1,i} & \ldots & R_n^{i-1} p_{i-1,n}] \\ & \vdots & & & \\ z_0^T \cdot S(R_0^{n-1} \cdot z_g) \cdot [0\ 0 & \ldots & 0\ 0 & \ldots & R_n^{n-1} p_{n-1,n}] \end{bmatrix};$$

$$Y_f = \begin{bmatrix} \mathrm{sgn}(\dot{q}_1) & \ldots & 0 & \ldots & 0 \\ & \vdots & & & \\ 0 & \ldots & \mathrm{sgn}(\dot{q}_i) & \ldots & 0 \\ & \vdots & & & \\ 0 & \ldots & 0 & \ldots & \mathrm{sgn}(\dot{q}_n) \end{bmatrix}$$

in the equation above, $S(\cdot)$ is a cross product operator, $Y_g$ is a matrix of $(n \times 4n)$, $Y_f$ is a diagonal matrix of $(n \times n)$, and $z_g$ is a unit vector with the same orientation as the static model of the robot is identified based on the equation (2) and using the least squares method, namely $$\pi^* = (Y^T \cdot Y)^{-1} \cdot Y^T \cdot T \quad (3)$$

in the equation above, $$Y = \begin{bmatrix} Y_1^* \\ M \\ Y_N^* \end{bmatrix}, \pi^* = \left(Y^T \cdot Y\right)^{-1} \cdot Y^T \cdot T.$$

Optionally, in the embodiment of the present disclosure, the position information on each joint of the robot includes:

a position of a key point of the robot or a trace of dragging of the robot during the drag teaching.

Optionally, in the embodiment of the present disclosure, a velocity fed back from each joint of the robot is filtered by a filter with a preset cutoff frequency to reduce a noise signal in the velocity signal; a square wave signal with a certain threshold value and a certain frequency is superposed to the feedforward signal to overcome a static friction force at the start of a drag teaching function, wherein the threshold value is set to be related to the magnitude of the static friction force, and the frequency is set to be related to a startup effect; and after the robot starts moving, the square wave signal is rapidly attenuated to zero.

Optionally, in the embodiment of the present disclosure, experimental data of a complete cycle are introduced into $Y^*$ according to the formula $\tau = Y^* g \pi^*$ to calculate a set of torque values predicted by the static model, and the torque values are compared with the recorded current commands to verify whether the identified parameters of the static model are correct or not.

The drag teaching system and method according to the present disclosure have the following advantages over the prior art:

A multi-dimensional force sensor is not required in the present disclosure, and the system is simple, has low cost, allows flexible teaching, has high teaching efficiency, and provides a new way for teaching various types of robots with complex motion traces.

DETAILED DESCRIPTION OF EMBODIMENTS

Embodiments embodying the features and advantages of the present disclosure will be described in detail in the following description. It is to be understood that the present disclosure may have various variations made on different examples without departing from the scope of the present disclosure, and the description and illustration herein are intended to be illustrative in nature and are not intended to limit the present disclosure.

Figure 1:
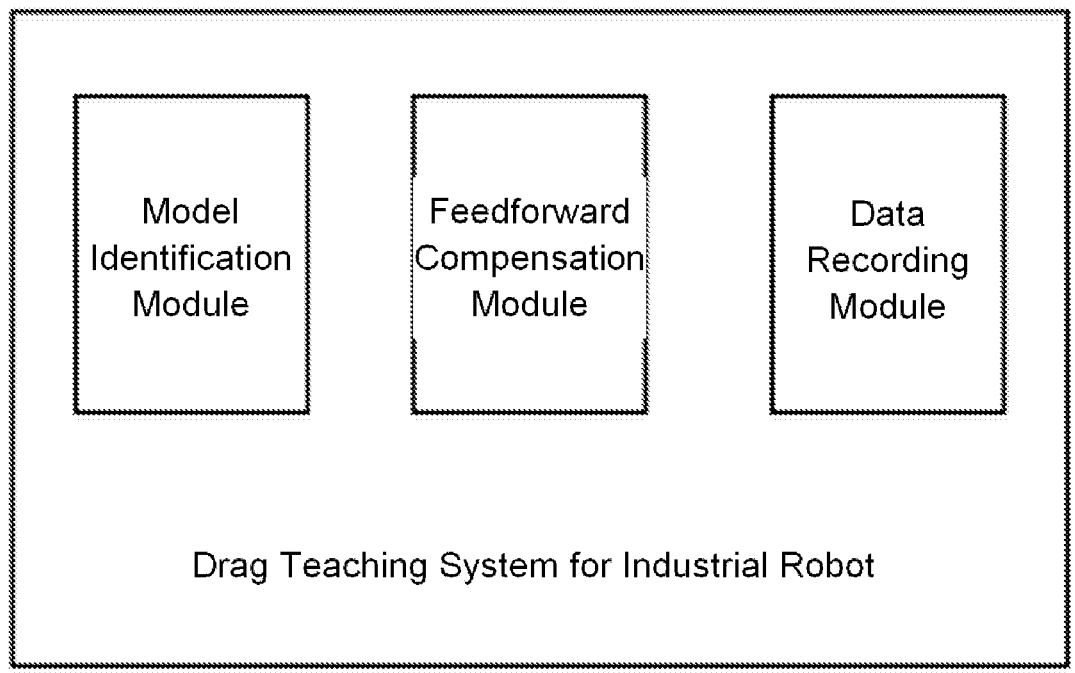
FIG. 1 is a block diagram showing the overall structure of a drag teaching system according to the present disclosure.

An embodiment of the present disclosure discloses a drag teaching system applicable to a robot. As shown in FIG. 1, the drag teaching system comprises: a model identification module configured to establish a static model of the robot and identify model parameters, wherein the static model includes a gravity model and a Coulomb friction model; a feedforward compensation module configured to transmit the identified model parameters to a current loop of a motor of each joint of the robot in a feedforward manner; and a data recording module configured to record position information on each joint of the robot for enabling the robot to reproduce a taught motion.

In the embodiment of the present disclosure, as an implementation mode, the static model of the robot is expressed as:

$$\tau_i = -z_0^T \cdot \left[\sum_{j=i}^{n} m_j(p_{i-1,j} + R_j^{i-1} \cdot r_j)\right] \times (R_0^{i-1} \cdot g) + f_i \cdot \text{sgn}(\dot{q}_i) \quad (1)$$

in the equation (1), i represents the $i^{th}$ link, $z_0$ is a constant vector $[0\ 0\ 1]^T$, $m_j$ is the mass of the $j^{th}$ link, $p_{i-1,j}$ is a vector oriented from an origin of a coordinate system for the $i-1^{th}$ link to an origin of a coordinate system for the $j^{th}$ link, $R_j^{i-1}$ is a rotation matrix from the coordinate system for the $j^{th}$ link to the coordinate system for the $i-1^{th}$ link, $r_j$ is a center-of-mass coordinate of the link in the coordinate system for the $j^{th}$ link, g is a gravity acceleration vector in the world coordinate system, $f_i$ is a Coulomb friction of a proximal joint of the link, $\text{sgn}(\dot{q}_i)$ is a sign operator, $\dot{q}_i$ is a velocity of the $i^{th}$ joint, and n is the number of the joints of the robot;

assuming $\tau = [\tau_1 \ldots \tau_i \ldots \tau_n]^T$, $\pi = [\pi_g^T \pi_f^T]^T$, where $\pi_g = g \cdot [m_1 r_1^T m_1 \ldots m_i r_i^T m_i \ldots m_n r_n^T m_n]^T$, g is the acceleration constant, and $\pi_f = [f_1 \ldots f_i \ldots f_n]^T$, the equation (1) may be expressed as:

$$\tau = Y \cdot \pi \quad (2)$$

in the equation above, $Y = [Y_g Y_f]$, which is a regression matrix, $$Y_g = \begin{bmatrix} z_0^T \cdot S(z_g) \cdot [R_1^0 p_{01} & \ldots & R_i^0 p_{0,i} & \ldots & R_n^0 p_{0,n}] \\ \vdots \\ z_0^T \cdot S(R_0^{i-1} \cdot z_g) \cdot [0\ 0 & \ldots & R_i^{i-1} p_{i-1,i} & \ldots & R_n^{i-1} p_{i-1,n}] \\ \vdots \\ z_0^T \cdot S(R_0^{n-1} \cdot z_g) \cdot [0\ 0 & \ldots & 0\ 0 & \ldots & R_n^{n-1} p_{n-1,n}] \end{bmatrix};$$

$$Y_f = \begin{bmatrix} \text{sgn}(\dot{q}_1) & \ldots & 0 & \ldots & 0 \\ & \vdots & & & \\ 0 & \ldots & \text{sgn}(\dot{q}_i) & \ldots & 0 \\ & \vdots & & & \\ 0 & \ldots & 0 & \ldots & \text{sgn}(\dot{q}_n) \end{bmatrix}$$

in the equation above, $S(\cdot)$ is a cross product operator, $Y_g$ is a matrix of $(n \times 4n)$, $Y_f$ is a diagonal matrix of $(n \times n)$, and $z_g$ is a unit vector with the same orientation as g;

the static model of the robot is identified based on the equation (2) and using the least squares method, namely $$\pi^* = (Y_T \cdot Y) - 1 \cdot Y_T \cdot T \quad (3)$$

in the equation above, $$Y = \begin{bmatrix} Y_1^* \\ M \\ Y_N^* \end{bmatrix}, \pi^* = (Y^T \cdot Y)^{-1} \cdot Y^T \cdot T.$$

In the embodiment of the present disclosure, as an implementation mode, the position information on each joint of the robot includes: a position of a key point of the robot or a trace of dragging of the robot during the drag teaching.

Figure 2:
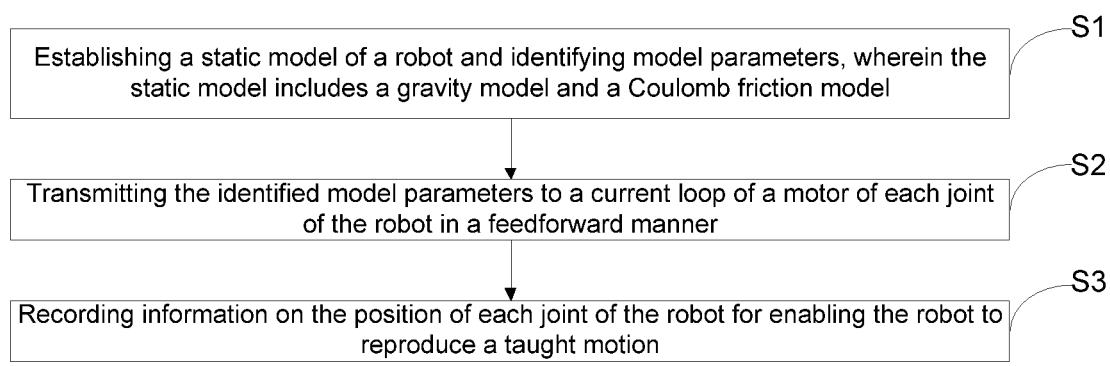
FIG. 2 is a flow chart of a drag teaching method according to the present disclosure.

In combination with the drag teaching system described above, the present disclosure also discloses a drag teaching method applicable to the drag teaching system described above, as shown in FIG. 2, comprising the following steps S1-S3:

S1: establishing a static model of a robot, and identifying model parameters, wherein the static model includes a gravity model and a Coulomb friction model.

S2: transmitting the identified model parameters to a current loop of a motor of each joint of the robot in a feedforward manner.

Specifically, a velocity fed back from each joint of the robot is filtered by a filter with a preset cutoff frequency to reduce a noise signal in the velocity signal. A square wave signal with a certain threshold value and a certain frequency is superposed to the feedforward signal, so as to overcome a static friction force at the start of the drag teaching function, wherein the threshold value is set to be related to the magnitude of the static friction force, and the frequency is set to be related to a startup effect. After the robot starts moving, the square wave signal is rapidly attenuated to zero to improve the comfort in the drag teaching.

In the embodiment of the present disclosure, as a specific example, the model parameters of the robot are identified. Here, a robot with the model number A-05-2 manufactured by Foxconn is taken as an example, and the DH (Denavit-Hartenberg) parameters thereof are shown in Table 1.

TABLE 1

Table of DH Parameters of the Serial Articulated Robot

| Link Number | α (rad) | a (mm) | d (mm) | θ (rad) |
|---|---|---|---|---|
| 1 | −π/2 | 75 | 360 | 0 |
| 2 | 0 | 270 | 0 | −π/2 |
| 3 | −π/2 | 110 | 0 | 0 |
| 4 | π/2 | 0 | 306 | 0 |
| 5 | −π/2 | 0 | 0 | 0 |
| 6 | 0 | 0 | 0 | 0 |

A regression matrix Y (6×30) or the robot can be calculated according to the formula (2), and it can be derived according to the rule of removing linear correlation column vectors from Y that columns 1, 2, 3, 4, 7, 8, 10, 12, 14, 16, 18, 20, 23, and 24 can be removed from Y to obtain Y* (6×16).

In the embodiment of the present disclosure, the robot is controlled by MicroLabBox developed by dSPACE; during the experiment, each joint of the robot is allowed to track a sinusoidal signal with a cycle of 400 s, with amplitudes being π, 0.4π, 0.3π, π, π, and π in order from the first axis to the sixth axis; at the same time, the fed back position of each joint and a current/torque command for each joint are recorded and converted to the link side. In this embodiment, 500 data points are randomly extracted respectively from the data in positive direction and negative direction to calculate Y*, respectively, and then τ and Y* corresponding to the respective points are arranged in the following form:

$$Y = \begin{bmatrix} Y_1^* \\ M \\ Y_{1000}^* \end{bmatrix}, T = \begin{bmatrix} \tau_1^T & L & \tau_{1000}^T \end{bmatrix}^T,$$

wherein Y is a matrix of (6000×16), and T is a column vector of (6000×1).

Figure 3:
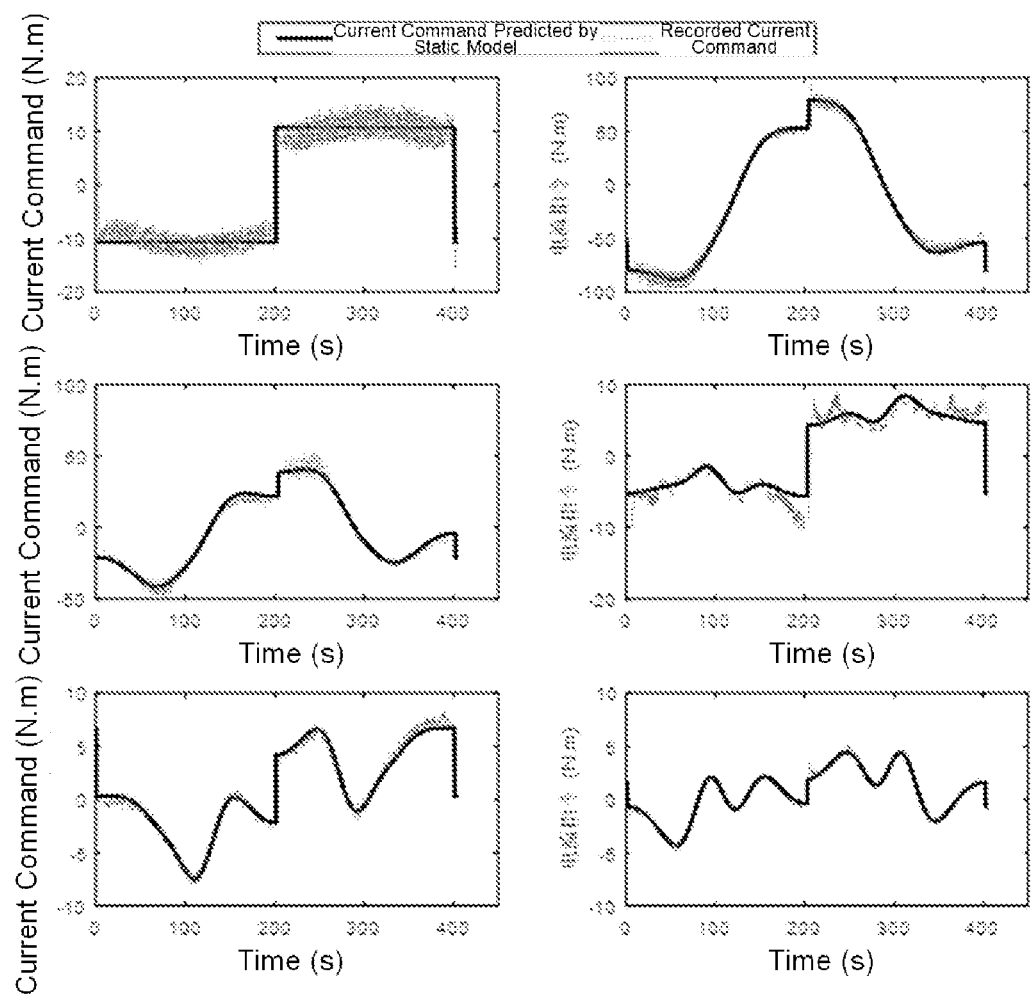
FIG. 3 is a graph for verification of an identification effect of a model identification module.

Finally, the parameters π* of the static model are calculated according to the formula (3) (see Table 2), wherein the first ten model parameters are gravity parameters, and the last six model parameters are friction parameters. In order to verify whether the identified parameters of the static model are correct or not, experimental data of a complete cycle are introduced into Y* according to the formula τ=Y*gπ* so that a set of torque values predicted by the static model are calculated and compared with the recorded current commands (on the link side). As a result, as shown in FIG. 3, there is a good consistency between the predicted commands and the experimental data, which demonstrates that the identified model parameters are correct.

TABLE 2

Identified Parameter Values of the Static Model

| Model Parameter | Value (N · m) | Standard Deviation σ (N · m) |
|---|---|---|
| π* (1) | 57.6236 | 0.1694 |
| π* (2) | 0.3428 | 0.1015 |
| π* (3) | 13.0967 | 0.0845 |
| π* (4) | 25.7057 | 0.0840 |
| π* (5) | 0.1663 | 0.0437 |
| π* (6) | −0.2694 | 0.0523 |
| π* (7) | −0.0069 | 0.0158 |
| π* (8) | 3.4484 | 0.0106 |
| π* (9) | 3.1992 | 0.0048 |
| π* (10) | −0.9099 | 0.0049 |
| π* (11) | 10.6672 | 0.0238 |
| π* (12) | 12.8996 | 0.0689 |
| π* (13) | 8.3933 | 0.0615 |
| π* (14) | 4.9496 | 0.0219 |
| π* (15) | 3.1910 | 0.0075 |
| π* (16) | 1.1455 | 0.0029 |

Figure 4:
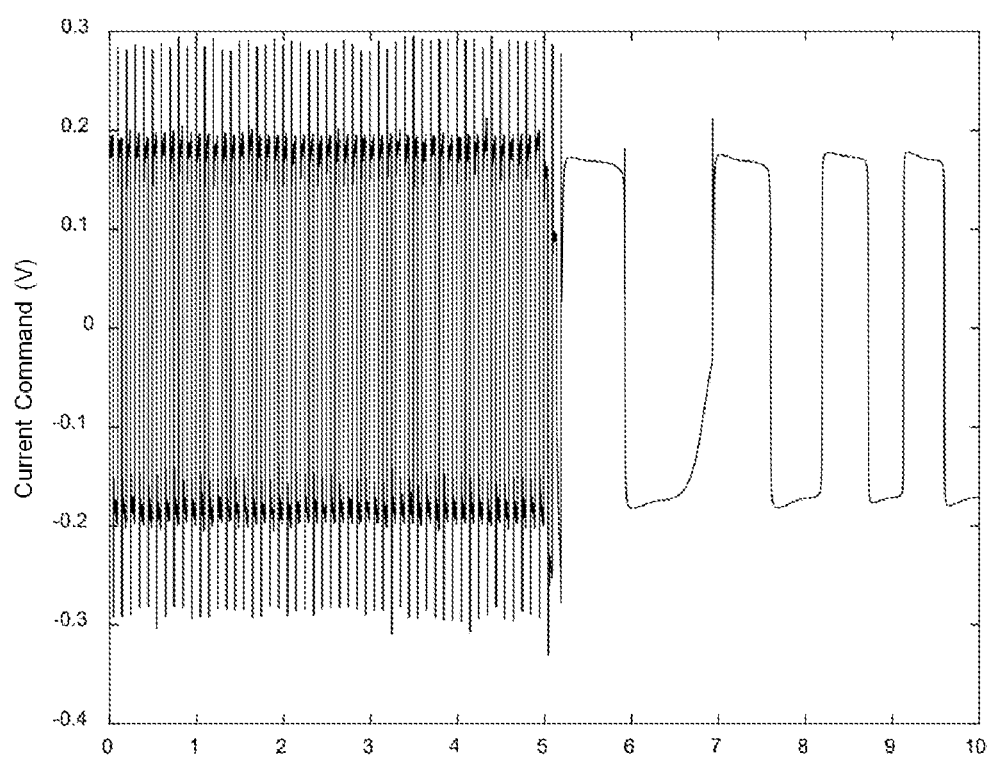
FIG. 4 is a graph showing an effect of a sixth joint of a feedforward compensation module.

On this basis, the identified model parameters are applied to the formula (2), and may be added to the current loops in a feedforward manner after being appropriately modified. Here, the sixth joint is taken as an example to specifically describe the modification. Firstly, the velocity signal is filtered by a first-order filter with a cutoff frequency of 10 Hz in order to remove noise from the velocity signal; secondly, due to its discontinuity, the $\mathrm{sgn}(\dot{q}_i)$ in the formula (2) is replaced with a continuous function $2/\pi$ a $\tan(K \cdot \dot{q}_i)$, where $\dot{q}_i$ is in unit of radians per second, and here K is set to be 500; and finally, a square wave is superposed to the current loop of the sixth joint, with the square wave having a frequency of 20 Hz and having an amplitude twice the magnitude of the identified friction when the sixth joint is stationary, and the amplitude of the square wave is exponentially attenuated as the velocity of the sixth joint is increased. The final effect of compensation is shown in FIG. 4. The sixth joint remains stationary within the first five seconds, during which the square wave is clearly visible, and the sixth joint is reciprocatingly moved by being dragged by hand within the last five seconds, during which it can be seen that the square wave is attenuated to almost zero, while Coulomb friction compensation dominates.

S3: recording information on the position of each joint of the robot is for enabling the robot to reproduce a taught motion.

Figure 5:
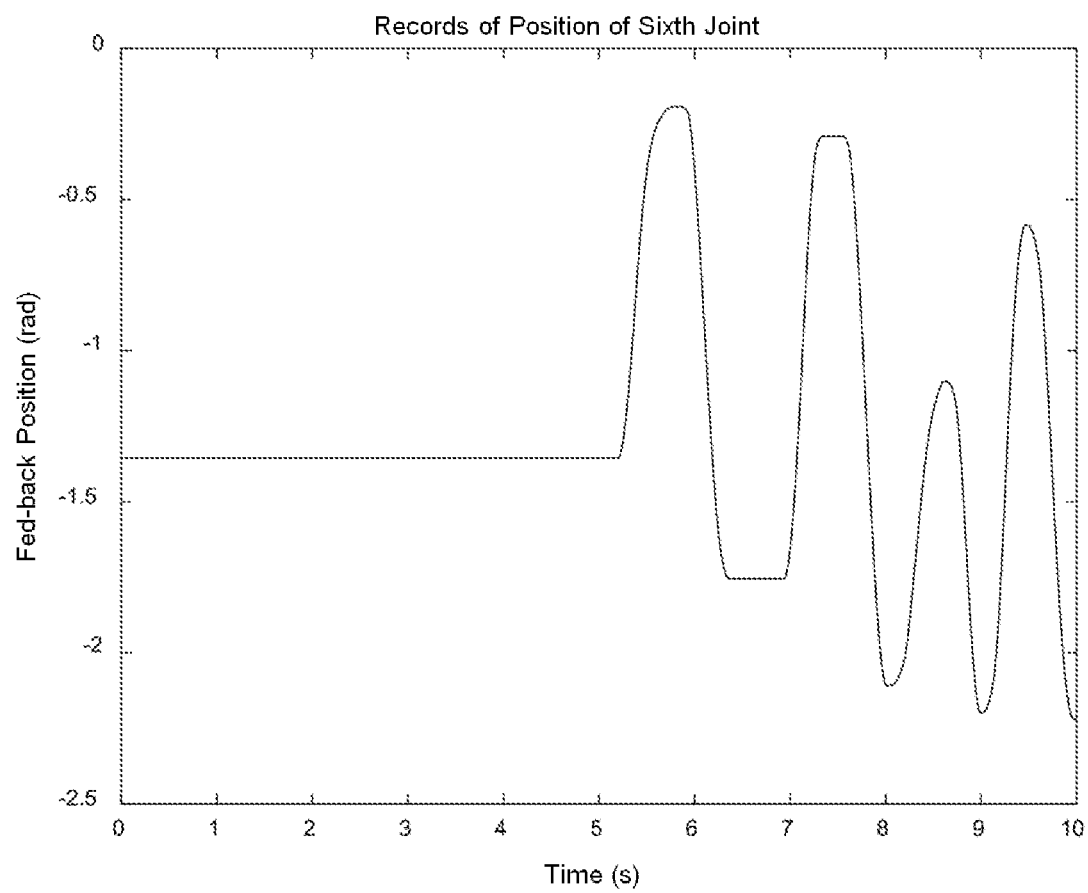
FIG. 5 is a graph showing the recorded trace of the sixth joint during a drag teaching process.

Specifically, as shown in FIG. 5 which shows a trace of dragging of the sixth joint that is recorded by the data recording module, the trace is recorded at equal time intervals, therefore the trace can be conveniently scaled with time, so that the reproduction of the taught path can be performed at different velocities.

Although the present disclosure has been described in detail by the above preferred embodiments, it is to be appreciated that the above description is not to be construed as limiting the present disclosure. Many modifications and alternatives to the present disclosure will be apparent to those skilled in the art after reading the above description. Therefore, the scope of protection of the present disclosure should be defined by the appended claims.

INDUSTRIAL APPLICABILITY

The drag teaching system and method according to the present disclosure enable a user to easily push up a robot to carry out tractive teaching without a multi-dimensional force sensor, and the system is simple, has low cost, allows flexible teaching, has high teaching efficiency, and provides a new way for teaching various types of robots with complex movement trajectories.

The invention claimed is:

1. A drag teaching method for teaching a robot with complex movement trajectories, comprising steps of:
   S1: establishing a static model of the robot and identifying model parameters, wherein the static model comprises a gravity model and a Coulomb friction model;
   S2: transmitting the identified model parameters to a current loop of a motor of each joint of the robot in a feedforward manner;
   wherein a velocity fed back from each joint of the robot is filtered by a filter with a preset cutoff frequency to reduce a noise signal in the velocity signal; a square wave signal with a certain threshold value and a certain frequency is superposed to the feedforward signal to overcome a static friction force at start of a drag teaching function, wherein the threshold value is set to be related to a magnitude of the static friction force, and the frequency is set to be related to a startup effect; and after the robot starts moving, the square wave signal is rapidly attenuated to zero; and
   S3: recording position information on each joint of the robot after verification of the identified model parameter to enable operation of the robot to reproduce a taught motion without using multi-dimensional force sensor.

2. The drag teaching method according to claim 1, wherein the static model of the robot is expressed as:

$$\tau_i = -z_0^T \cdot \left[ \sum_{j=i}^{n} m_j (p_{i-1,j} + R_j^{i-1} \cdot r_j) \right] \times (R_0^{i-1} \cdot g_v) + f_i \cdot \mathrm{sgn}(\dot{q}_i) \quad (1)$$

wherein in the equation (1), i represents the $i^{th}$ link, $z_0$ is a constant vector $[0\ 0\ 1]^T$, $m_j$ is mass of the $j^{th}$ link, $p_{i-1,j}$ is a vector oriented from an origin of a coordinate system for the $i-1^{th}$ link to an origin of a coordinate system for the $j^{th}$ link, $R_j^{i-1}$ is a rotation matrix from the coordinate system for the $j^{th}$ link to the coordinate system for the $i-1^{th}$ link, $r_j$ is a center-of-mass coordinate of the link in the coordinate system for the $j^{th}$ link, $g_v$ is a gravity acceleration vector in a world coordinate system, $f_i$ is a Coulomb friction of a proximal joint of the link, $\mathrm{sgn}(\dot{q}_i)$ is a sign operator, $\dot{q}_i$ is a velocity of the $i^{th}$ joint, and n is the number of the joints of the robot; when $\tau=[\tau_1 \ldots \tau_i \ldots \tau_n]^T$, $\pi=[\pi_g^T \pi_f^T]^T$, wherein $\pi_g = g \cdot [m_1 r_1^T m_1 \ldots m_i r_i^T m_i \ldots m_n r_n^T m_n]^T$, g is the acceleration constant, and $\pi_f = [f_1 \ldots f_i \ldots f_n]^T$, the equation (1) may be expressed as:

$$\tau = Y \cdot \pi \quad (2)$$

in the equation (2), $Y=[Y_g Y_f]$, which is a regression matrix, $$Y_g = \begin{bmatrix} z_0^T \cdot S(z_g) \cdot [R_1^0 p_{01} & \ldots & R_i^0 p_{0,i} & \ldots & R_n^0 p_{0,n}] \\ \vdots & & & & \\ z_0^T \cdot S(R_0^{i-1} \cdot z_g) \cdot [0\ 0 & \ldots & R_i^{i-1} p_{i-1,i} & \ldots & R_n^{i-1} p_{i-1,n}] \\ \vdots & & & & \\ z_0^T \cdot S(R_0^{n-1} \cdot z_g) \cdot [0\ 0 & \ldots & 0\ 0 & \ldots & R_n^{n-1} p_{n-1,n}] \end{bmatrix}$$

$$Y_f = \begin{bmatrix} \operatorname{sgn}(\dot{q}_1) & \ldots & 0 & \ldots & 0 \\ & \vdots & & & \\ 0 & \ldots & \operatorname{sgn}(\dot{q}_i) & \ldots & 0 \\ & \vdots & & & \\ 0 & \ldots & 0 & \ldots & \operatorname{sgn}(\dot{q}_n) \end{bmatrix}$$

in the equation above, S(·) is a cross product operator, $Y_g$ is a matrix of (n×4n), $Y_f$ is a diagonal matrix of (n×n), and $z_g$ is a unit vector with the same orientation as $g_v$; the static model of the robot is identified based on the equation (2) and using the least squares method, namely $$\tau^* = (Y^T \cdot Y)^{-1} \cdot Y^T \cdot T \quad (3)$$

in the equation (3), $$Y = \begin{bmatrix} Y_1^* \\ M \\ Y_N^* \end{bmatrix}, \pi^* = (Y^T \cdot Y)^{-1} \cdot Y^T \cdot T.$$

3. The drag teaching method according to claim 1, wherein the position information on each joint of the robot comprises:

a position of a key point of the robot or a trace of dragging of the robot during the drag teaching.

4. The drag teaching method according to claim 2, wherein experimental data of a complete cycle are introduced into Y* according to the formula $\tau = Y_g^* \pi^*$ to calculate a set of torque values predicted by the static model, and the torque values are compared with the recorded current commands to verify whether the identified parameters of the static model are correct or not.

5. The drag teaching method according to claim 2, wherein the position information on each joint of the robot comprises:

a position of a key point of the robot or a trace of dragging of the robot during the drag teaching.

6. The drag teaching method according to claim 3, wherein experimental data of a complete cycle are introduced into Y* according to the formula $\tau = Y_g^* \pi^*$ to calculate a set of torque values predicted by the static model, and the torque values are compared with the recorded current commands to verify whether the identified parameters of the static model are correct or not.

\* \* \* \* \*